United States Patent [19]
Walsh et al.

[11] Patent Number: 5,875,630
[45] Date of Patent: Mar. 2, 1999

[54] HYDRAULIC DRIVE ASSEMBLY

[75] Inventors: John P. Walsh, Kirkland, Wash.; Ian D. Patterson, Wootton Bassett, United Kingdom

[73] Assignee: Sauer Inc., Ames, Iowa

[21] Appl. No.: 872,625

[22] Filed: Jun. 10, 1997

[51] Int. Cl.⁶ .................................................. F16D 31/02
[52] U.S. Cl. .............................. 60/421; 60/428; 60/449; 60/452; 51/516; 51/532
[58] Field of Search ............................ 60/445, 452, 449, 60/451, 428, 420, 421, 422, 429, 430; 91/516, 532

[56] References Cited

U.S. PATENT DOCUMENTS

| | | |
|---|---|---|
| 3,942,486 | 3/1976 | Kirchner . |
| 4,179,888 | 12/1979 | Goscenski, Jr. . |
| 4,348,900 | 9/1982 | Nolte et al. . |
| 4,366,783 | 1/1983 | Clemente . |
| 4,395,878 | 8/1983 | Morita et al. .......................... 60/488 X |
| 4,446,697 | 5/1984 | Goscenski, Jr. . |
| 4,461,246 | 7/1984 | Clemente . |
| 4,738,330 | 4/1988 | Suzuki et al. . |
| 4,773,216 | 9/1988 | Ohashi et al. ........................ 91/516 X |
| 4,966,066 | 10/1990 | Kauss et al. .......................... 60/422 X |
| 5,029,067 | 7/1991 | Nishida et al. ........................ 60/421 X |
| 5,165,377 | 11/1992 | Hosseini . |
| 5,216,983 | 6/1993 | Nilson . |
| 5,303,551 | 4/1994 | Lee ........................................ 60/452 X |
| 5,317,871 | 6/1994 | Ito et al. ................................. 60/452 |
| 5,359,969 | 11/1994 | Dickrell et al. . |
| 5,398,505 | 3/1995 | Oogushi et al. ...................... 91/532 X |
| 5,531,190 | 7/1996 | Mork . |
| 5,692,377 | 12/1997 | Moriya et al. ............................ 60/421 |

FOREIGN PATENT DOCUMENTS 2191847  12/1987  United Kingdom .

*Primary Examiner*—Hoang Nguyen
*Attorney, Agent, or Firm*—Zarley, McKee, Thomte, Voorhees & Sease

[57] ABSTRACT

A hydraulic drive assembly includes a variable displacement pump fluidly connected in a closed loop circuit with a motor for driving an ancillary device, such as a fan. An auxiliary pump can be operatively connected to the pump, the motor and a reservoir for replenishing fluid losses in the closed loop circuit. An auxiliary circuit connected to the pump has a recirculating passage fluidly connected to the closed loop circuit downstream of the motor to reduce the necessary reservoir volume. A method for smoothly and continuously adjusting the output of the pump to drive the ancillary device is also disclosed.

12 Claims, 2 Drawing Sheets

HYDRAULIC DRIVE ASSEMBLY

BACKGROUND OF THE INVENTION

The present invention relates to a hydraulic drive assembly to support ancillary functions associated with engine driven vehicles. More particularly, this invention relates to a hydraulic drive system which provides improved efficiency by utilizing a variable displacement pump whereby the output flow can be varied to match system drive requirements. The invention is well-suited for smoothly and efficiently operating a cooling fan or compressor in an over-the-road vehicle.

A variety of conventional engines, including internal combustion engines, are available for powering vehicles. In the process of powering the vehicle, these engines develop considerable heat. therefore, one common ancillary function that must be performed on such vehicles is the cooling of the engine, typically with a fan system. Such fan systems typically include a fan which, continuously or intermittently on demand, pulls air through a radiator. Other ancillary function can also be accomplished by drawing power from the engine. For instance, a compressor can be driven to provide air conditioning, refrigeration or a brake system.

Typically, two types of drive systems exist for ancillary functions. In one type, direct belt drives are utilized. Electromagnetic or air cycle the drive off and on as required. With the belt drives, the ancillary drive is limited to abrupt full on or full off operation. This discrete and rapid actuation is generally noisy and results in high wear and maintenance on the components. In addition, belt drives are not dynamically adjustable to match actual ancillary system requirements. Consequently, systems that require maximum output at low engine speed have large components that generate inefficient excess output at increased engine speeds.

The second type of ancillary drive system incorporates a fixed displacement hydraulic pump with a bypass or "dump" valve for off/on cycling or modulation. The fixed displacement pump generates flow irrespective of the actual ancillary system requirements, which means that when the pump is sized to provide maximum output requirements at the lowest engine speed, it will generate excess flow at increased engine speeds. All excess flow is diverted inefficiently back to a reservoir. Furthermore, additional control valves are needed where modulation is required. Like the belt drive systems, the fixed displacement pump hydraulic drives fail to efficiently match output flow with ancillary system requirements.

Therefore, a primary object of the present invention is the provision of a hydraulic drive system which matches its output to the ancillary system requirements.

A further object of the present invention is the provision of a hydraulic drive system which utilizes electronic command signals from a computer or microprocessor system to match output flow with the ancillary system requirements.

A further object of the present invention is the provision of a hydraulic drive system to accommodate the utilization of an on-board engine or vehicle computer or microprocessor system to provide electronic command signals.

A further object of the present invention is the provision of an improved hydraulic drive system for an engine cooling fan.

A further object of this invention is the provision of a hydraulic drive system which allows fans or other ancillary devices to be remotely mounted.

A further object of the present invention is the provision of a hydraulic drive system comprising a closed loop hydraulic circuit that includes a variable displacement pump and a hydraulic motor for driving a fan or other ancillary device.

A further object of the present invention is the provision of a hydraulic drive system wherein oil is recirculated from an auxiliary hydraulic circuit and injected into the closed loop for make-up oil.

A further object of the present invention is the provision of a hydraulic drive system requiring a smaller hydraulic reservoir volume.

These and other objects will be apparent to those skilled in the art.

SUMMARY OF THE INVENTION

The present invention relates to a hydraulic drive assembly to support ancillary devices, including but not limited to cooling fans, compressors, alternators, etc. One aspect of this invention is the provision of an electronically controlled variable displacement pump in a closed circuit with a hydraulic motor for driving the ancillary device based upon a signal from the engine computer or microprocessor. For instance, an engine radiator cooling fan can be driven when a temperature sensor indicates a demand for cooling to the microprocessor. The ancillary device is smoothly ramped on and off.

Another aspect of this invention is utilizing the fluid exhausted from an auxiliary circuit, such as the power steering circuit, to replenish the losses in the closed circuit loop. Using a closed circuit rather than a conventional open circuit for ancillary drive and replenishing it in this manner allows a smaller reservoir to be used. This results in significant cost, space and weight savings.

DETAILED DESCRIPTION OF THE PREFERRED EMBODIMENTS

Figure 1:
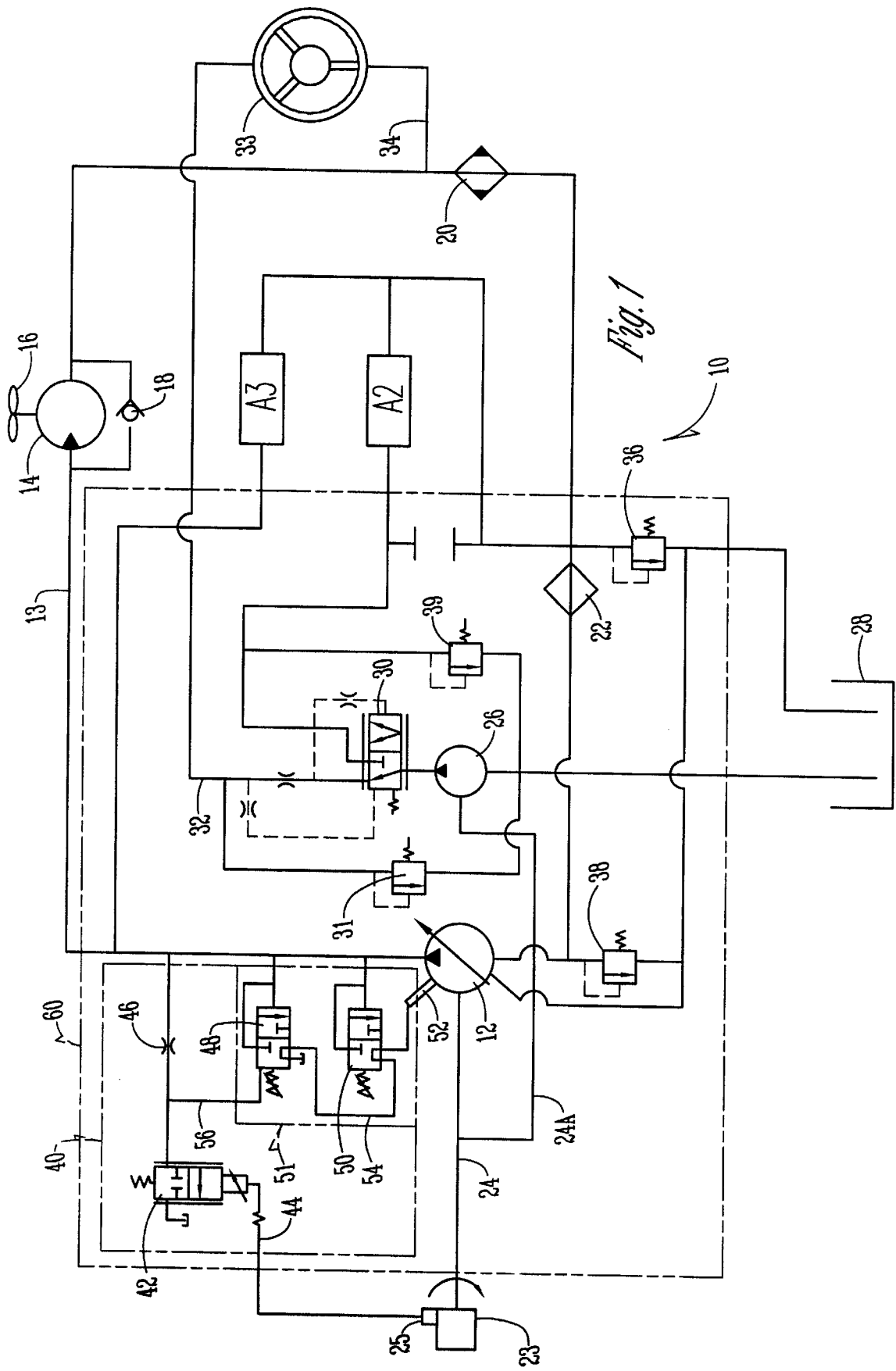
FIG. 1 is a schematic diagram of the hydraulic drive system or assembly of the present invention.

The hydraulic drive system or assembly of the present invention is generally designated in the drawings by the reference numeral 10. In FIG. 1, the hydraulic drive assembly 10 includes an electronically controlled variable displacement pump 12 fluidly connected in a closed loop circuit 13 with a hydraulic motor 14, which drives an ancillary device 16 such as a fan. Preferably the motor 14 is a fixed displacement motor with an anticavitation check valve 18. The closed loop circuit 13 also includes a heat exchanger 20 and a filter 22.

An engine 23 is drivingly connected to an input shaft 24 on the pump 12. The engine is equipped with an on-board computer or microprocessor 25 which receives vehicle system parameter signals from a plurality of sensors (not shown).

Through a drive connection 24A the engine 23 also drives an auxiliary pump 26, which is remote from the pump 12. Auxiliary pump 26 is a fixed displacement pump which draws fluid from a reservoir 28 and pumps it through a priority flow divider 30 to the power steering circuit 32 as a first priority, and then to an auxiliary circuit A2 as a second priority. Thus, auxiliary pump 26 is also referred to hereinafter as the power steering pump. The priority flow divider 30 has a relief valve 31 associated therewith for setting the maximum pressure for the priority function.

Power steering circuit 32 provides fluid power for the steering function mechanism of the vehicle. The auxiliary circuit A2 can provide fluid power for various functions, including but not limited to lift mechanisms or fluid powered implements. In FIG. 1, the power steering circuit 32 includes a recirculating circuit 34 which fluidly connects the exhaust outlet of the power steering actuator 33 to the closed loop circuit 13 downstream of the motor 14, preferably upstream of the heat exchanger 20.

The recirculating circuit 34 of the present invention includes a filter protection relief valve 36 and a charge relief valve 38. The filter protection relief valve 36, which is typically set about 75 psi higher than the charge relief valve setting, prevents over-pressurization of the filter 22 during cold temperature startup. The secondary priority auxiliary circuit A2 includes relief valve 39 which limits the maximum pressure in circuit A2.

Additional auxiliary circuit A3 is connected to the output circuit of variably displacement pump 12. Such auxiliary circuit is utilized to supply fluid power at a variable rate to ancillary functions. Ancillary functions include, but are not limited to electrical alternator or generator drives, air conditioning refrigerant compressor drives, and brake air compressor drives.

An electronic control valve 42 is operatively connected to the variable displacement pump 12. The electronic control valve 42 receives electronic signals 44 from the on-board computer or sensor/microprocessor system 25 of the vehicle. The control valve 42 is connected to the output of the pump 12 and an orifice 46 is provided in the connecting line.

Two hydraulic control valves 48, 50 connect to the control valve 42 downstream of the orifice 46.

The valves 48, 50 constitute a variable pressure compensating/load sensing system 51. Basically, the valves 48, 50 are three-way, two position spool valves which are adjustably biased towards one position. The valves 48, 50 are preferably mounted directly on the pump 12. The valve 48 is load sensing and the valve 50 is pressure compensating.

The valve 50 is fluidly connected to the displacement varying means of the pump 12. The displacement varying means of the pump includes a conventional swashplate (not shown in detail, but indicated symbolically by the long arrow through the pump 12) and a servo means 52 operatively connected to the swashplate in a conventional manner. The valves 48, 50 are fluidly connected by a passage 54. A conduit or passage 56 connects the control valve 48 with the electronic control valve 42.

The valves 48, 50 and the orifice 46 are arranged so as to provide a gradual adjustment of the displacement of fluid from the pump 12 to the fan motor 14. Thus, the electronic control 40 provides a gradual powering of the fan motor 14 in response to various system parameters monitored by the on-board computer or microprocessor 25. This response differs from the abrupt on/off fan motor operation of the prior art.

In operation, the hydraulic drive assembly 10 is charged with recirculated fluid from the power steering actuator 33 by the power steering pump 26. Charge pressure is established by the charge relief valve 38. Part of the flow from the power steering pump 26 goes through the priority flow divider 30 to drive the power steering actuator 33. The fluid exhausted from the steering actuator 33 returns to the closed loop circuit 13 through the conduit 34 to help replenish any fluid losses. Once the demand for priority flow to the steering circuit 32 has been satisfied, excess flow from the power steering pump 26 is available for other uses, such as the second auxiliary circuit A2. On the other hand, the first auxiliary circuit A3 receives oil from the pump 12, but only when the pump 12 has a positive displacement.

The variable displacement pump 12 also provides a variable displacement or flow of fluid to the fan motor 14. The electronic control valve 42 adjusts the displacement of the pump 12 according to the electronic signals 44 from the vehicle computer or microprocessor 25. The valves 42, 48, 50 provide for a relatively smooth change in the displacement of the pump 12. For the illustrated fan drive system, the signals can be derived from a temperature sensor (not shown) disposed in the engine coolant. The electronic control logic is such that the pump 12 displaces fluid and the fan motor 14 is driven so long as the temperature sensor and computer 25 determine there is a need for additional cooling. The electronic control valve 42 is spring biased into the position shown when the control signal 44 has a zero current. With the control valve 42 in that position, the fan motor 14 will run continuously until a nonzero signal is sent by the computer or microprocessor 25, indicating that the need for cooling has been reduced. Then the control valve 42 proportionally moves against the spring and toward the uppermost position. In response, the fan motor 14 ramps on and off, avoiding any undesirable noisy type operation.

The closed loop circuit of this hydraulic drive system allows the system to operate with less hydraulic fluid volume (and a smaller reservoir) because some of the fluid which would have otherwise needed to pass through the reservoir is redirected to replenish fluid losses in the closed loop.

Electronically controlled, variable displacement pump 12 can provide fluid power to ancillary systems other than a cooling fan, such as an air conditioning refrigerant compressor. In this case the pressure in the refrigerant circuit would be sensed and coupled with electronic control logic that would signal the pump 12 to displace fluid to a compressor motor on demand.

Figure 2:
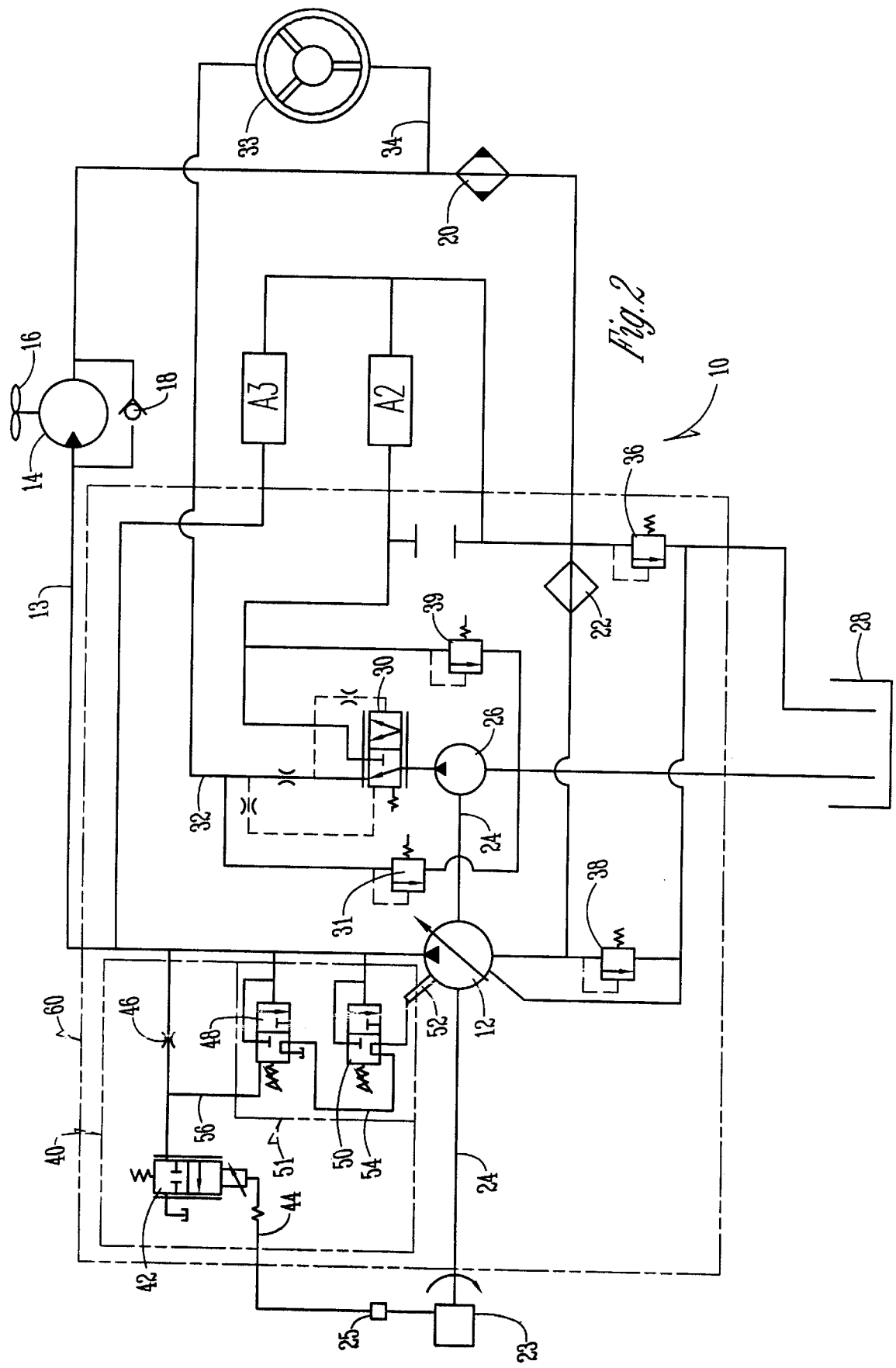
FIG. 2 is a schematic diagram of an alternative embodiment of the hydraulic drive system or assembly of the present invention.

An alternative embodiment of the invention is shown in FIG. 2, which differs from FIG. 1 in two respects. First, the computer or microprocessor 25 is remote from the engine rather than mounted on it. Among other things, this provides greater flexibility in the overall vehicle design, moves the microprocessor away from the heat of the engine, and allows a microprocessor or computer to be retrofitted into vehicles not originally equipped with an on-board computer or microprocessor. Second, the auxiliary pump 26 is mounted on the pump 12 and is driven by the input shaft of the pump 12. Such an integrated package can save space, greatly simplify the drive connections from the engine, and reduce the number of external connections required. Of course, other embodiments are also possible when the embodiment of FIG. 1 is modified by incorporating only one of the above two features.

Therefore, it can be seen that the present invention at least accomplishes its stated objects.

What is claimed is:

1. A hydraulic drive assembly comprising:
   an electronically controlled variable displacement pump;
   a hydraulic motor fluidly connected in a closed loop circuit with the pump for receiving an output flow therefrom and thereby driving an ancillary device;
   a fluid reservoir;
   an auxiliary pump operatively connected to the reservoir, for drawing fluid from the reservoir and supplying the fluid to the closed loop circuit for replenishing fluid losses therein;

an auxiliary hydraulic circuit fluidly connected to the auxiliary pump and having a recirculating conduit fluidly connected to the closed loop circuit downstream of the motor.

2. The hydraulic drive assembly of claim 1 wherein the auxiliary hydraulic circuit operates a power steering device.

3. The hydraulic drive assembly of claim 1 wherein the ancillary device is a fan.

4. The hydraulic drive assembly of claim 1 wherein the ancillary device is a compressor.

5. The hydraulic drive assembly of claim 1 wherein the ancillary device is an electrical generating device.

6. The hydraulic drive assembly of claim 1 comprising an engine drivingly connected to the pump, a computer, and an electrohydraulic control system operatively connected to the pump for varying the displacement of the pump connected to the computer, and thereby the output flow received by the motor, in response to electronic control signals from the computer.

7. The hydraulic drive assembly of claim 6 where the computer is mounted on the engine.

8. The hydraulic drive assembly of claim 1 comprising a second auxiliary hydraulic circuit fluidly connected to the auxiliary pump and having an recirculating conduit which drains to the reservoir.

9. The hydraulic drive assembly of claim 1 comprising an engine drivingly connected to the pump.

10. The hydraulic drive assembly of claim 1 wherein the electrohydraulic control system includes an electric proportional pressure control which is spring biased to an open position.

11. A hydraulic drive assembly comprising:

a variable displacement pump;

a hydraulic motor fluidly connected in a closed loop circuit with the pump for receiving an output flow therefrom and thereby driving an ancillary device;

a fluid reservoir;

an auxiliary pump operatively connected to the pump, the reservoir, and the motor for drawing fluid from the reservoir and supplying the fluid to the closed loop circuit for replenishing fluid losses therein; and an auxiliary hydraulic circuit fluidly connected to the auxiliary pump and having a recirculating passage fluidly connected to the closed loop circuit downstream of the motor.

12. A method of continuously adjusting output from a pump to drive an ancillary device, comprising:

providing a variable displacement pump and a hydraulic motor operatively connected in a closed loop circuit, the hydraulic motor being drivingly connected to the ancillary device;

generating an electronic command signal indicative of an engine system parameter related to the driving of the ancillary device;

controlling the displacement of the pump based on the electronic command signal;

whereby the pump displacement is proportional to the command signal and thereby the ancillary device is driven at a speed which is proportional to the command signal.

* * * * *